United States Patent [19]

Haner

[11] Patent Number: 4,879,501

[45] Date of Patent: Nov. 7, 1989

[54] CONSTANT SPEED HYDROSTATIC DRIVE SYSTEM

[75] Inventor: Lambert Haner, Rocky River, Ohio

[73] Assignee: Commercial Shearing, Inc., Youngstown, Ohio

[21] Appl. No.: 448,648

[22] Filed: Dec. 10, 1982

[51] Int. Cl.$^4$ ............................................ G05D 16/00
[52] U.S. Cl. ................................... 318/645; 290/40 R
[58] Field of Search ..................... 290/40 R, 40 C, 43, 290/54; 318/645, 599, 661; 60/452

[56] References Cited

U.S. PATENT DOCUMENTS

| | | | |
|---|---|---|---|
| 2,916,635 | 12/1959 | Nicita | 290/40 C |
| 3,247,717 | 4/1966 | Kemmer | 318/645 X |
| 3,564,273 | 2/1971 | Cockrell | 290/40 |
| 3,612,975 | 10/1971 | Keefe | 318/599 |
| 3,796,939 | 3/1974 | Raggi | 318/599 |
| 3,798,907 | 3/1974 | Barrett | 290/40 X |
| 3,810,251 | 5/1974 | Blanyer | 290/40 |
| 3,886,921 | 6/1975 | Hafner | 290/40 X |
| 3,987,624 | 10/1976 | Cooke | 60/452 X |
| 4,053,786 | 10/1977 | Jones | 290/40 R X |
| 4,245,162 | 1/1981 | Rennen | 290/40 R |
| 4,270,055 | 5/1981 | Ronnen | 290/40 R X |
| 4,425,758 | 1/1984 | Schexnaydel | 60/452 X |

FOREIGN PATENT DOCUMENTS

| | | |
|---|---|---|
| 967926 | 9/1964 | United Kingdom . |
| 1123992 | 9/1968 | United Kingdom . |
| 1312597 | 4/1973 | United Kingdom . |
| 1377182 | 12/1974 | United Kingdom . |

Primary Examiner—William M. Shoop, Jr.
Attorney, Agent, or Firm—Buchanan Ingersoll

[57] ABSTRACT

A constant speed hydrostatic drive system is disclosed wherein a generator drive shaft is maintained at a constant speed by utilizing an electro-hydraulic controlled displacement pump responsive to a pressure transducer to control a hydraulic motor. A speed sensor is used to produce a direct current signal responsive to the drive shaft speed. The signal is converted into a series of voltage pulses also responsive to the shaft speed which are compared to a speed reference signal to provide a speed error signal. A loop gain control means is provided to utilize said speed error signal to adjust the shaft speed to coincide with said reference signal. A timing reference and digital trim control are also provided to compensate for long term drifting in the type speed control circuit described above.

12 Claims, 5 Drawing Sheets

CONSTANT SPEED HYDROSTATIC DRIVE SYSTEM

This invention relates to constant speed hydrostatic drive systems and particularly to such systems wherein a generator drive shaft is maintained at constant speed utilizing an electro-hydraulic controlled displacement pump responsive to a pressure transducer to control a hydraulic motor.

The use of an electro-hydraulic displacement control system is disclosed in applicant's U.S. Pat. No. 4,358,724 of Nov. 9, 1982.

The use of a pressure feedback loop in conjunction with an electro-hydraulic control circuit is also known in the art. These pressure feedback interloops were utilized in hydroelectric radar drive systems in the early 1960's. These systems, however, were position conytrol devices not speed controlled as provided by the present invention.

There are numerous field applications for electrical power where commercial power lines are not available to supply the needed electrical power. A most practical means for creating this field of electrical power is to use an electrical generator driven by a diesel or gasoline engine. Generally, the diesel engine is used to supply mechanical power to other equipment in the field and the electrical generator requires only a small fraction of the total power capability of the diesel engine, and therefore, cannot be directly attached to the output shaft of the engine. The electrical equipment to be powered by the generator requires a certain minimum quality of power. First, the voltage amplitude must be held within limits and this is accomplished with a generator field regulator. Secondly, the frequency of the electrical power must be held within certain limits and this can only be done by regulating the speed at which the generator is driven. The diesel engine speed will vary considerably, perhaps a 3:1 range. Therefore, a constant speed drive system must be used to transmit power from the diesel engine to the generator shaft.

The present invention provides a solution to the problem of maintaining the generator drive shaft at a constant speed by utilizing an electro-hydraulic controlled variable displacement pump responsive to a pressure transducer in conjunction with a hydraulic motor and necessary connections.

A means to control the speed of the drive shaft is provided wherein a speed sensor produces an electrical signal the frequency of which is responsive to the rotational speed of said drive shaft. This signal is converted into a series of constant area pulses having an average voltage also responsive to the speed of the shaft. This average voltage is compared to a speed reference signal to provide a speed error signal which is utilized by a loop gain control means to adjust the shaft speed to coincide with said reference signal.

Due to the fact the above described speed control circuit is an analog type circuit, it is susceptible to long term drift. This results in a change in the reference speed of the control when the system is operated for long periods or over wide temperature ranges. It is sometimes desirable to maintain a very accurate average speed, therefore, the present invention also provides an accurate timing reference and digital trim control for the speed control loop.

The timing reference and digital trim control comprises a crystal controlled oscillator with suitable divider circuits to provide an accurate frequency reference means. An up/down counter is utilized to compute the frequency difference between said timing reference and the reference frequency described above. A digital to analog converter means is then utilized to produce an output voltage relative to said frequency difference. A speed control means responsive to this output voltage trims or augments the speed sensor frequency to correspond to the reference frequency thereby assuring an accurate long term average shaft speed.

The operation and additional advantages of the present invention will be more fully understood from the following description of the invention and reference to the accompanying drawings in which.

Figure 1:
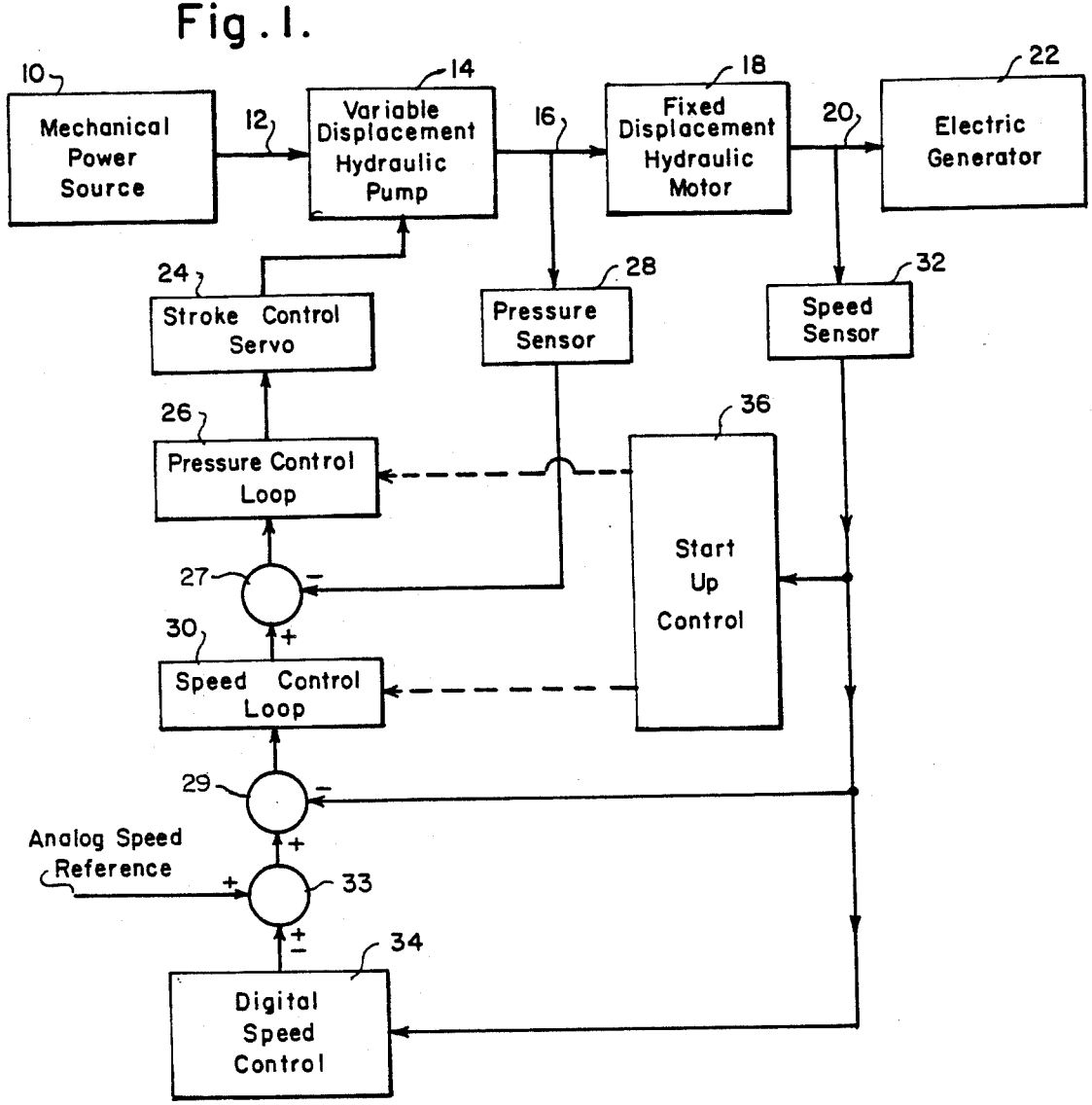
FIG. 1 is a block diagram for a constant speed generator drive system according to the present invention.

Referring specifically to the drawings, FIG. 1 is a block diagram for a constant speed generator drive system according to the present invention. Block 10 is a mechanical source of power used to rotate input shaft 12. Typically, block 10 is either a diesel or a gasoline engine. Block 14 is a variable displacement hydraulic piston pump driven by shaft 12. Hydraulic fluid flows from pump 14 through lines 16 into a fixed displacement hydraulic motor shown in block 18. Hydraulic motor 18 may be either gear or piston type. The output drive shaft 20 of the hydraulic motor 18 provides mechanical power to drive an electric generator shown in block 22.

In order to maintain drive shaft 20 at a constant speed, the hydraulic fluid flow delivered by pump 14 must be controlled by manipulating the stroke or displacement of pump 14. An electronic control system is designed to control the displacement of pump 14 to maintain a constant generator speed. Without such a control, the speed of motor 18 would vary with the diesel engine speed and with generator load because of fluid leverage in both motor 18 and pump 14.

The speed regulating system is comprised of several feedback loops. First, there is the stroke control servo shown in block 24. The stroke control servo is comprised of an electronic servo motor and an electronic power amplifier. The position of the servo motor shaft from a given reference position is proportional to the magnitude of the direct current signal input to the servo amplifier. Hence, the stroke position is also in direct proportion to the magnitude of the direct current signal input. The stroke control servo is operatively connected to pump 14 as shown.

Secondly, there is a pressure control loop as shown in block 26. A pressure sensor 28 connected to hydraulic lines 16 delivers a direct current signal proportional to the hydraulic pressure to the pressure control loop 26 through summing junction 27. This is the pressure feedback signals compared to the pressure command signal delivered by the output from the speed control amplifier. The action of the pressure control circuit produces a line pressure in proportion to the output of the speed control amplifier. This direct current signal in the control loop will cause a proportional hydraulic pressure to develop.

Thirdly, there is a speed control loop shown in block 30. A speed sensor 32 is attached to drive shaft 20. The speed sensor delivers an electrical signal proportional to the drive shaft speed to the speed control loop through summing junction 29 as shown.

As a consequence of the total control action of these feedback loops interconnected as shown in FIG. 1 drive shaft 20 is maintained at a speed which is directly proportional to an analog speed reference 33.

Since analog circuits will inherently drift in value over periods of time, a digital speed control shown in block 34 using an accurate ultra stable time reference is used to create a trim signal which is added algebraically to the analog speed reference in order to compensate for long term drifts. The digital speed control will maintain the average speed of drive shaft 20 at exactly the desired speed to maintain a constant frequency from generator 22.

A special start up control circuit shown in block 36 is needed in the control system in order to prevent an excessive overspeed transient from occuring when the system is started. As. shown, a direct current signal from speed sensor 32 is utilized by the start up control to send appropriate signals to the pressure control loop 26 and to the speed control loop 30.

Figure 2:
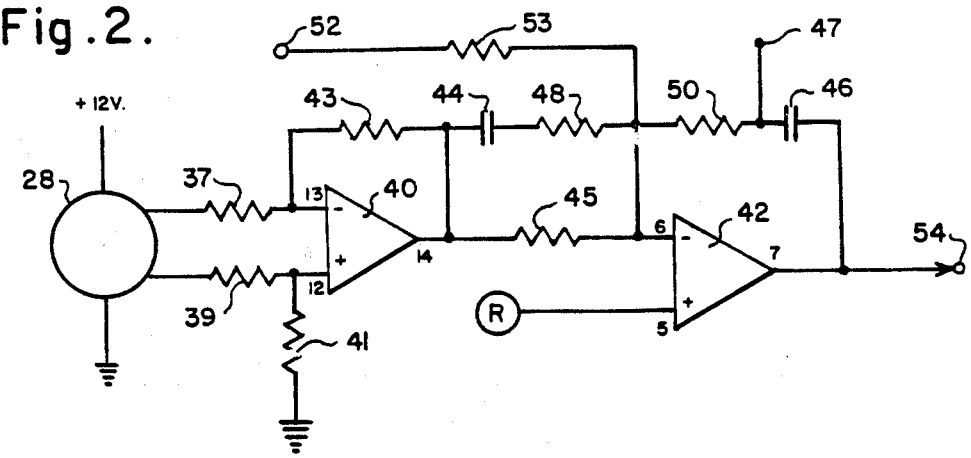
FIG. 2 is a schematic diagram of the pressure control loop shown in FIG. 1.

FIG. 2 is a schematic diagram of the preferred electronic circuit for the pressure control loop designated as block 26 in FIG. 1. Pressure sensor 28 which is strain gage bridge is excited with 12 volts of direct current power as shown. The bridge output through resister 37 and 39 is a balanced direct current signal that is proportional to pressure. This signal is amplified by amplifier 40. Amplifier 40 is a quad operational amplifier such as model LM 2902. Resistors 41, 43 and 45 are provided as shown. Amplifier 42 is used as the pressure control amplifier and has a pressure loop compensating network associated with it comprising capacitors 44 and 46 and resistors 48 and 50. The input pressure command signal from the speed control loop enters the pressure control loop at input 52 through resistor 53. An output signal from output 54 is fed into the stroke control servo designated as block 24 on FIG. 1.

Figure 3:
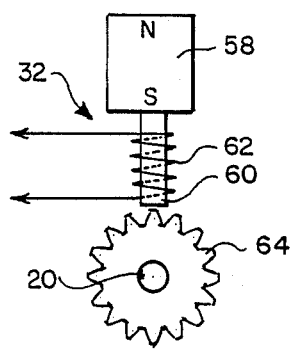
FIG. 3 is a cross sectional view of the speed sensor shown in FIG. 1.

A speed sensor shown in FIG. 3 is required to produce a direct current signal proportional to the shaft speed of the hydraulic motor. The speed sensor could be a direct current tachometer. However, a precision tachometer is expensive and also has a commutator and brushes. It is preferable in this application to have a brushless sensor and one which is relatively inexpensive. Therefore, a reluctance type of sensor is preferred. The sensor 32 comprises a permanent magnet 58, a pole piece 60 and a coil of wire 62. A steel gear 64 is mounted on drive shaft 20 and the reluctance pick up sensor 32 is mounted in close proximity so that as the shaft rotates, each successive gear tooth passes by the sensor thereby inducing a voltage in the coil 62. As the gear 64 rotates a nearly sinusoidal signal is produced with each wave cycle representing the passage of a single gear tooth. It follows that the shaft speed in revolutions per second times the number of teeth on the gear will equal the frequency of the signal produced. Reluctance speed sensors of this type are commercially available.

This sine wave signal is converted to a square wave which is in turn converted into a series of constant area pulses, one pulse for each cycle of the square wave. The average direct current voltage produced by this series of contant area pulses is directly proportional to the frequency.

Figure 4:
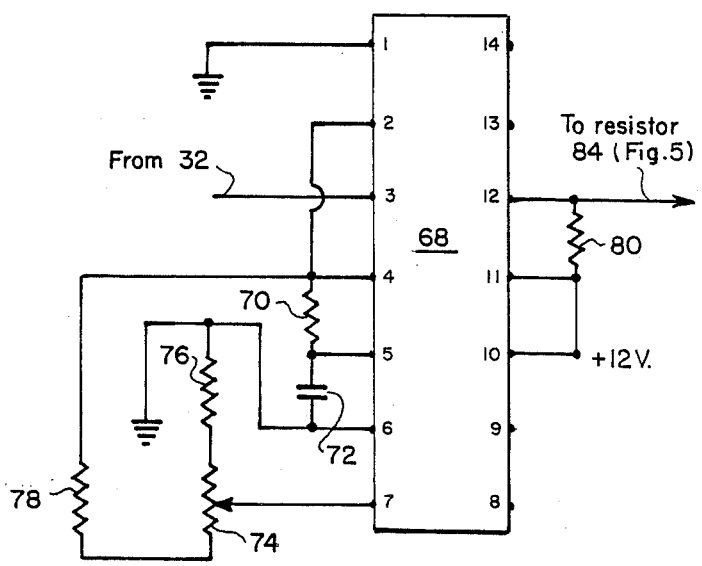
FIG. 4 is a schematic diagram of a frequency to voltage converter.

FIG. 4 is a circuit diagram of a frequency to voltage converter used to produce the constant area pulse output described above. The basic functional element is an electronic integrated circuit 68. IC 68 is a model LM 322 precision timer. The square wave signal from the speed sensor is connected directly to pin #3 which is the trigger of IC 68. A constant area pulse is delivered on pin #12. The basic timing for the period or the pulse is accomplished by the timing circuit composed of resistor 70 and capacitor 72 connected as shown. IC 68 will clamp pin #5 to ground shorting capacitor 72 until a trigger signal is given from the positive going edge of the square wave. At that time the clamp is removed and the voltage on capacitor 72 rises as it is charged by the current supplied through resistor 70 from pin #4. When the voltage on capacitor 72 reaches the voltage level on pin #7 the timing cycle ends and capacitor 72 is again clamped to ground. As capacitor 72 is charging the voltage on pin #12 is high, at all other times it is near ground. Potentiometer 74 in conjunction with resistors 76 and 78 provides a means to adjust the pulse width by about ±5%. Power is supplied to IC 68 to pin #5, #10 and #11 and a resistor 80 is provided between pin #11 and #12. Pin #1 is grounded.

Figure 5:
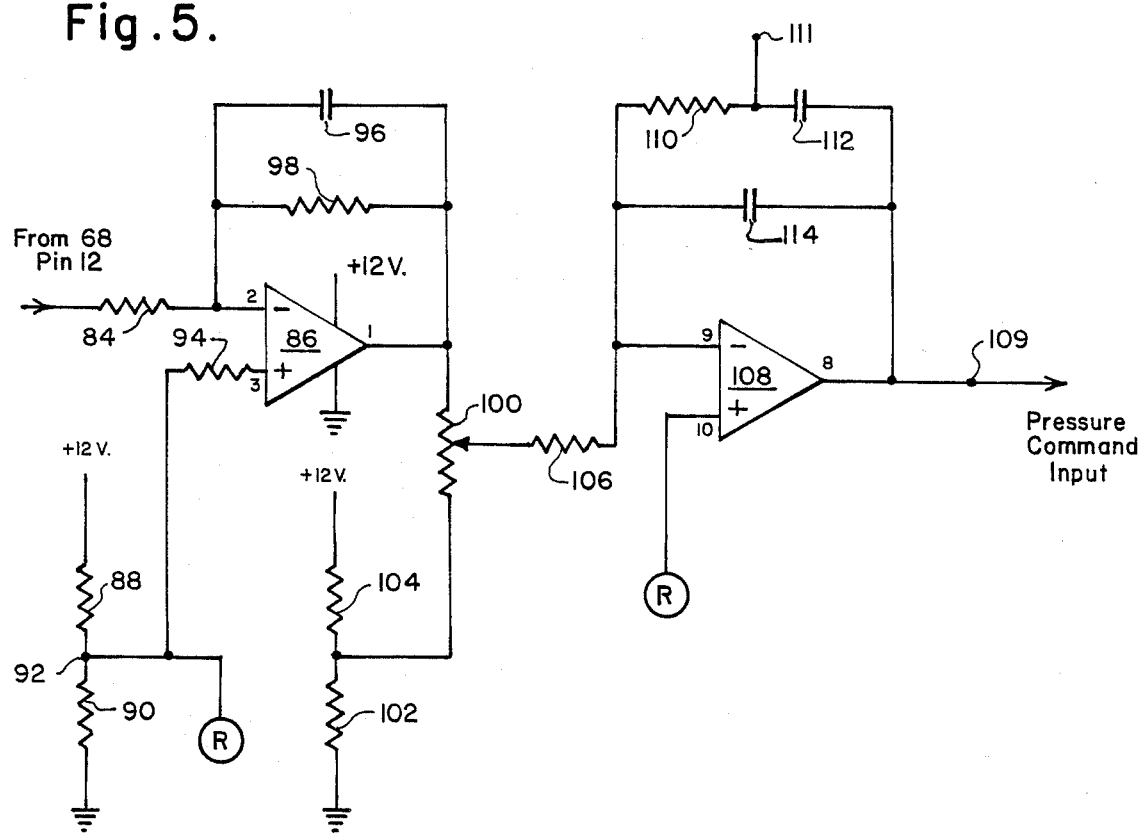
FIG. 5 is a schematic diagram of the speed control loop circuit shown in FIG. 1.

FIG. 5 is a schematic diagram of the speed loop control circuit. The constant area pulse from pin #12 of IC 68 shown in FIG. 4 enters pin #2 of operational amplifier 86 through resistor 84 as shown. Operational amplifier 86 is constructed basically as a summing amplifier. It is designed to operate with a signal supply voltage of +12 volts direct current. As a result, a circuit voltage reference is established at +6 volts. The junction 92 between resistors 88 and 90 provides the +6 volt reference designated as R which enters pin #3 of amplifier 86 through resistor 94. The output voltage on pin #1 of amplifier 86 is twelve minus the average voltage of the constant area pulse input. The actual speed error signal is the difference between the voltage output on pin #1 of amplifier 86 and the +6 volt reference. In other words, the voltage reference R is for all intents and purposes the speed command or speed reference. Capacitor 96 across feedback resistor 98 connected between pin #2 and #1 of amplifier 86 is included only to provide filtering of the signal. This filtering is necessary to prevent circuit overdrive since the input signal looks like a square wave. Capacitor 96, however, cannot be too large because it will affect the control system dynamics. Two possible ways to prevent this effect would be to reduce the time constant or increase the number of teeth on the speed sensor gear thereby increasing the frequency and making the filtering more effective.

The output signal from pin #1 of amplifier 86 is fed to potentiometer 100 which is connected to a resistor divider, comprising resistors 102 and 104, to bias the signal at +6 volts. The purpose of potentiometer 100 is to provide a loop gain control for the speed control loop. The output signal from potentiometer 100 is fed through resistor 106 into pin #9 of operational amplifier 108. Amplifier 108 together with resistor 110, capacitor 112 and capacitor 114 are used to add the necessary compensation for the speed control system. A +6 volt reference R is also provided to pin #10 of amplifier 108. The output of pin #8 of amplifier 108 is fed into the pressure control loop shown as block 26 of FIG. 1 and is referred to as the pressure command input.

A special start up control circuit is needed in the control system in order to prevent an excessive overspeed transient from occuring when the system is started. Regardless of whether the control system is powered by a battery supply or strictly by the output of the generator, there is some extended period of time during start up where the generator speed is well below the reference speed established by the control. The speed control error is then large and calls for a maximum voltage level on pin #8 of amplifier 108 (FIG. 5) and on pin #7 of amplifier 42 (FIG. 2). Under this condition the compensating network capacitors 112 (FIG. 5) and 46 (FIG. 2) will charge up to the maximum voltage (about six volts). When the generator speed is equal to the called for reference speed the capacitors will be fully charged and the speed control circuit will be commanding maximum pressure from the pressure loop while the pressure loop in return is commanding maximum stroke on the pump. The capacitors cannot begin to reduce their charge until the error signal reverses, that is, until the generator speed is above the commanded reference. The resistors 110 (FIG. 5) and 50 (FIG. 2) are provided to limit the charging rate of the capacitors. Because of the RC time constant, there is a delay before the capacitors have been charged in the opposite direction to reduce the stored charge. As a consequence, the hydraulic motor will drive the generator overspeed by an unacceptable amount, perhaps 10 to 20% above the responsive speed which is preferably 1800 RPM. The start up control circuit is needed to reduce or to a large extent eliminate this overspeed transient.

Figure 6:
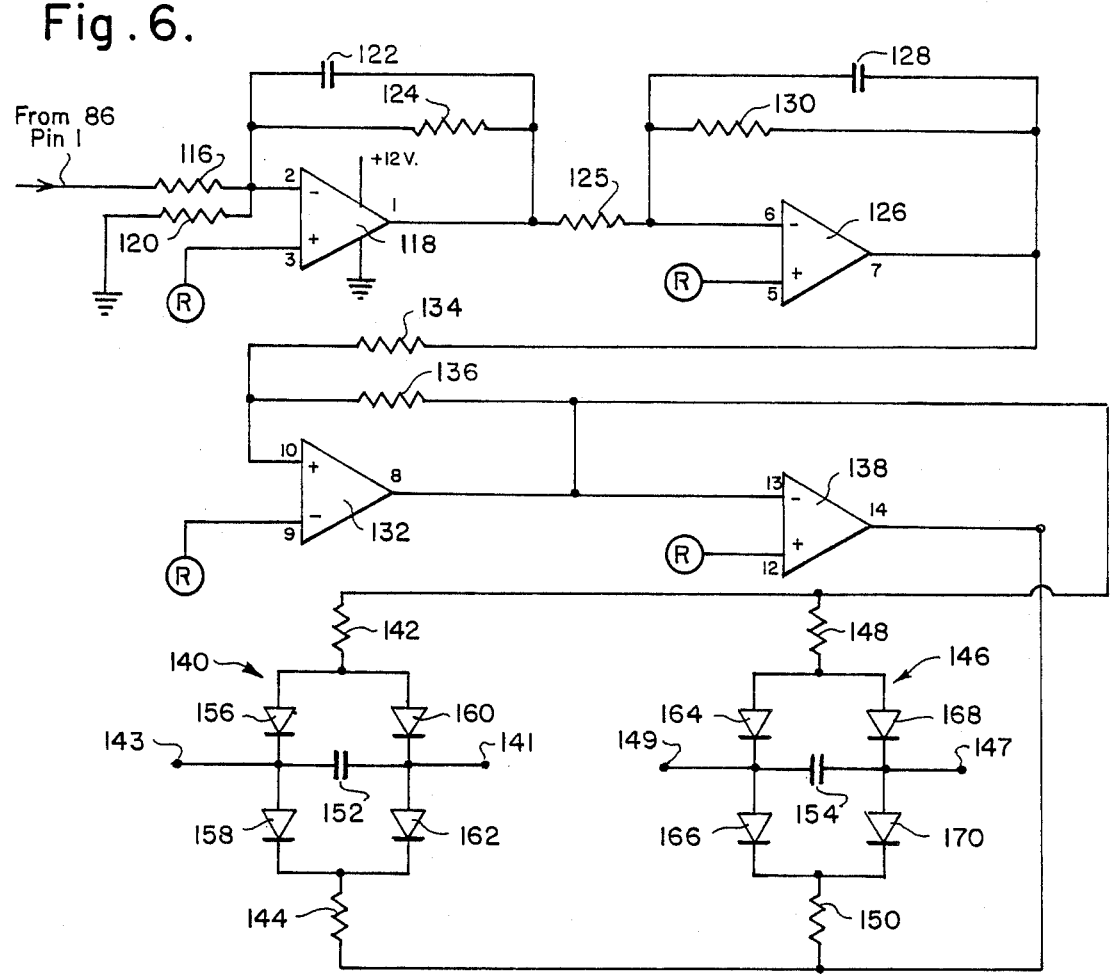
FIG. 6 is a schematic diagram of the start up control circuit shown in FIG. 1.

FIG. 6 is a schematic diagram for the start up control ciruit. Basically, the circuit functions to short out the capacitors 112 (FIG. 5) and 46 (FIG. 2) while the generator speed is more than 10% below the reference speed. When the generator speed is within the 10% band (generator speed is greater than 90% of the reference) then the capacitors 112 and 46 are unshorted and the control system will respond as it does in normal operation thus preventing a large overspeed condition from occuring. The circuit operates as follows:

The error signal voltage at pin #1 of amplifier 86 shown in FIG. 5 is at the reference R level when the speed error is zero (the reference is +½ V supply with respect to common). The error signal voltage has a scale factor of 6 volts/1800 RPM. Therefore, when the generator speed is 90% of the reference speed then the voltage at pin #1 of amplifier 86 (FIG. 5) is 6.6 volts. Referring now to FIG. 6, this signal from pin #1 of amplifier 86 (FIG. 5) feeds into amplifier 118 through the summing resistor 116 to pin #2 of said amplifier 118. Resistor 120 is connected from pin #2 of amplifier 118 to ground to create an input bias such that the voltage on pin #2 is equal to the reference voltage supplied to pin #3 of amplifier 118. The output voltage on pin #1 of amplifier 118 will also be at the 6 volt reference under that condition. As the speed varies from that point, the output voltage on pin #1 of amplifier 118 will vary in a linear fashion with the same scale factor of 6 volts/1800 RPM. Capacitor 122 and feedback resistor 124 are used to filter the voltage ripple. Pin #6 of the following amplifier 126 is connected from pin #1 of amplifier 118 through resistor 125. Amplifier 126 is connected as a unity gain inverter and capacitor 128 and feedback resistor 130 provide additional filtering. The time constant of each amplifier filter is 0.002 seconds. This is large enough to filter the 900 HZ ripple (40 DB attenuation) but small enough not to interfere with the circuit performance. Pin #5 of amplifier 126 is also supplied with a +6 volt reference. At pin #7 of amplifier 126 we now have a well filtered DC signal that is proportional to speed error but is equal to reference R when the generator speed is 10% below the reference speed of 1800 RPM. When the generator speed is below 1620 RPM the voltage on pin #7 amplifier 126 is above R and pin #8 of amplifier 132 is high (near +V supply) which forces pin #14 of amplifier 138 to below (near common or zero volts). Amplifiers 132 and 138 are also supplied with a +6 volt reference and resistors 136 and 136 are provided. This condition causes the diode bridge switches 140 and 146 connected into the circuit through resistors 142, 144, 148 and 150 as shown, to essentially short capacitors 152 and 154. The bridges are forward biased and the voltage across each capacitor is zero. When the generator speed is above 1620 RPM the voltage on pin #7 of amplifier 126 is below R and pin #8 of amplifier 132 is now low which forces pin #14 of amplifier 138 to be high. In this condition, the bridge diodes 156, 158, 160, 162, 164, 166, 168 and 170 are all reversed biased and essentially open circuits. This condition then allows the capacitors 152 and 154 to be unshorted. Notice that one half of each bridge connects to an amplifier output junctions 141 and 147 connect to points 109 of FIG. 5 and 54 of FIG. 2 respectively, therefore, any leakage currents through the diodes flow into the OP AMP output which merely appears as a minuscule load to the amplifier. The other half of the bridge connects from junctions 143 and 149 to junction 111 of FIG. 5 and junction 47 of FIG. 2 respectively which then connect to the amplifier input through each resistor 110 (FIG. 5) and 50 (FIG. 2). The reverse diode leakage currents are nearly the same and also very small and of opposite polarities, hence, they tend to balance or cancel each other. The result is that the electronic switch has a nearly infinite resistance across each capacitor and therefore does not affect the circuit network performance. For this reason preference is given this kind of electronic switch rather than using an analog switch multiplexer such as the CMOS intergrated circuit MC 14066B. The CMOS switch has leakage current that may affect the circuit.

Due to the factthat the speed control circuit is an analog type of circuit, it is susceptable to long term drift. Thus, especially over long periods of operation or over wide temperature ranges, the set point or reference speed of the control will change or vary. When a very accurate average speed is required an accurate and stable timing reference must be used in conjunction with a digital trim control for the speed loop.

When the generator is running at exactly 1800 RPM the frequency delivered by the speed sensor will be 900 HZ. If a 900 HZ reference signal is also provided and we continuously compare the speed signal frequency to the reference frequency, we will be able to see how much the speed signal drifts from the reference. A circuit is therefore needed that will provide a signal proportional to the difference, and use that difference signal to produce a trim correction to maintain the speed at exactly at 900 HZ. This is accomplished as follows:

An accurate 900 HZ frequency reference fr is fed into the positive (or up) input of an up/down (or reversible) counter. The speed sensor frequency fs (block 32 of FIG. 1) is fed into the negative (or down) input of the reversible counter. Each cycle of the reference fr causes the counter to add one count to its stored register or number. Each cycle of the sensor fs causes the counter to substract one count from its started register. The number stored in the counter is therefore the time integral of the frequency difference.

$$\begin{matrix}\text{Number stored}\\\text{in counter}\end{matrix} = \int_{-\infty}^{+\infty}[fr - fs]dt$$

A digital to analog converter is then utilized to produce an output voltage proportional to the number stored in the counter. This analog voltage is then fed into the speed control to trim or augment the speed reference. It is clear that the digital trim control works to make the average frequency of the speed sensor fs to be precisely the same frequency as the accurate frequency reference fr.

Since the equivalent integrating time constant of the digital trim circuit is very long compared to the speed control dynamics the trim circuit does not interfere with or affect the speed control dynamic response.

Figure 7:
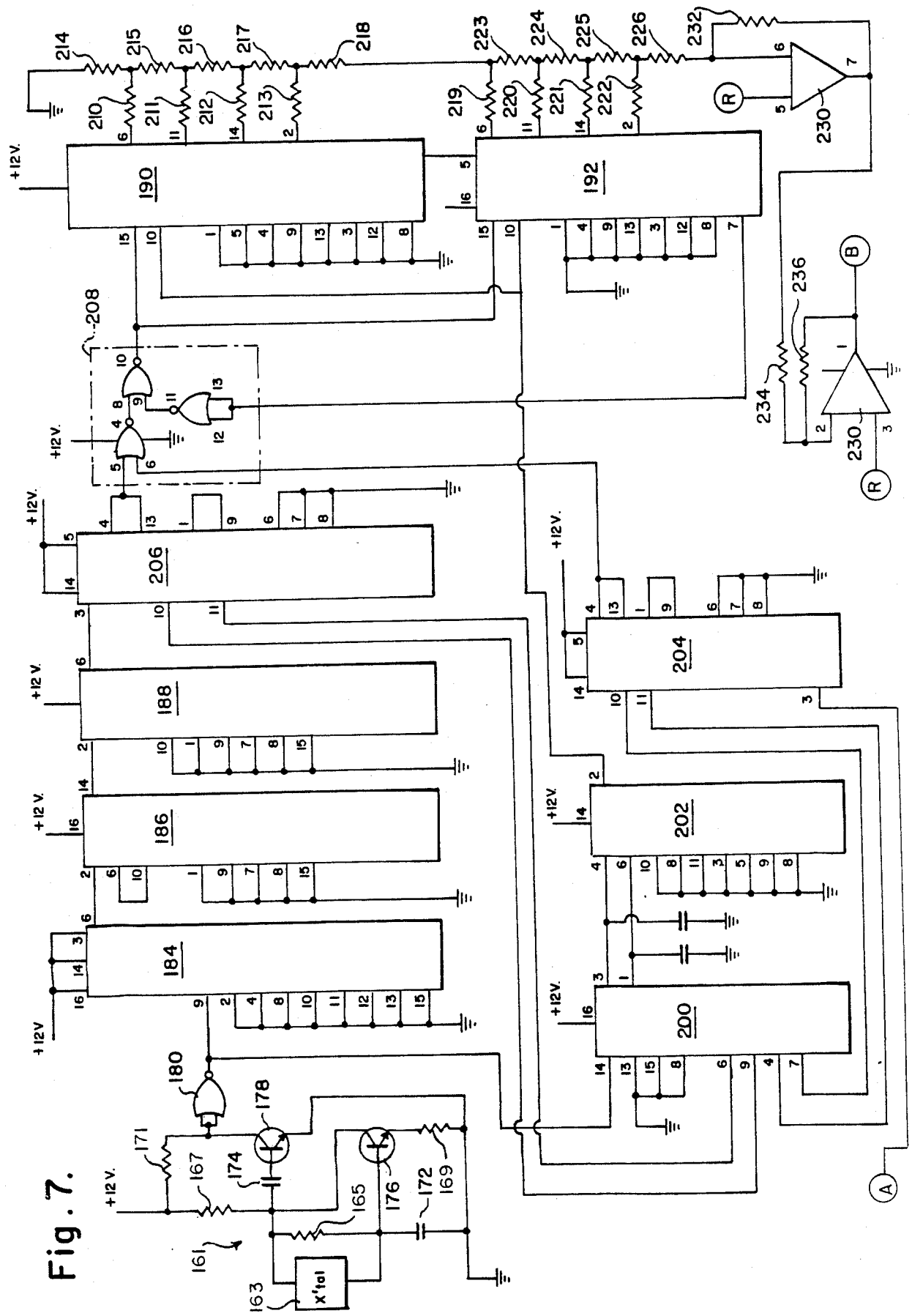
FIG. 7 is a schematic diagram of the timing reference and digital trim control circuit.

FIG. 7 is the complete circuit schematic for a preferred digital trim control used in this invention. All interconnections are made as shown in the drawing and the operation is explained as follows:

A one megahertz crystal controlled oscillater 161 is provided comprising a one-megahertz crystal 162, resistors 165, 167, 169 and 171, capacitors 172 and 174, transistors 176 and 178 and a two input nor gate integrated circuit 180 all connected as shown.

Figure 8:
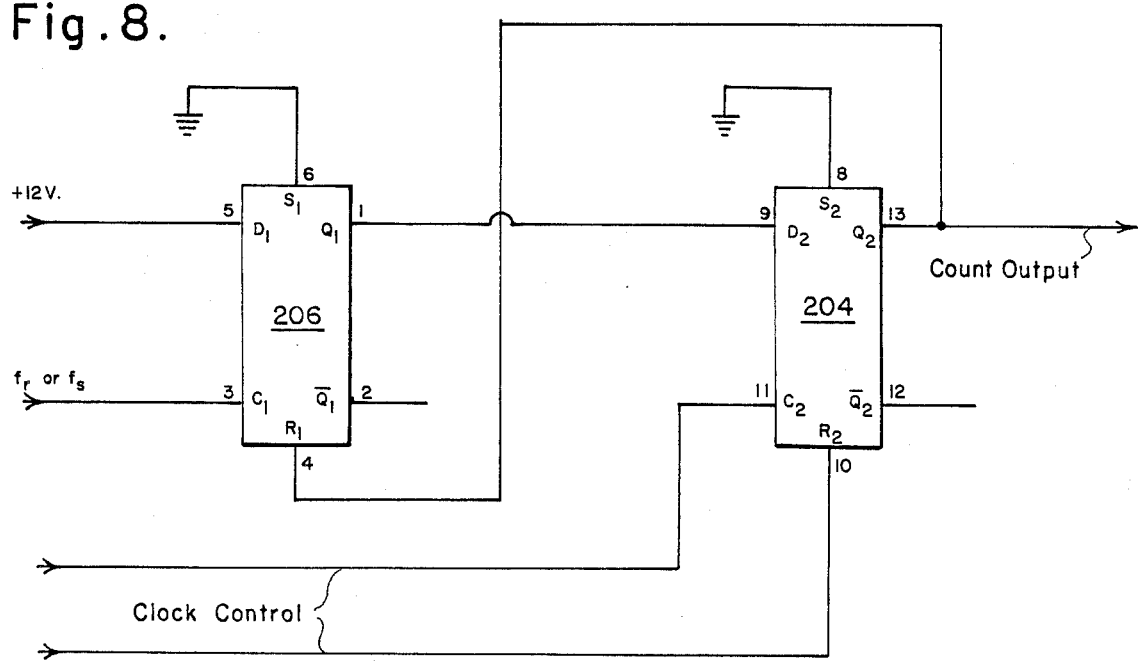
FIG. 8 is a schematic diagram showing the interconnection of the integrated circuits 206 and 208 of FIG. 7.

Said oscillator 160 provides a aquare wave type signal at the output of the two input nor gate integrated circuit 180. This signal is connected to pin #9 of integrated circuit 184. IC 184 is a "rate multiplier" model MC 14527B. The rate multiplier is a digital device that will deliver one to nine output pulses for every ten input pulses depending upon how it is programmed. IC 184 is programmed to deliver nine output pulses for every ten input pulses. As a result, the output frequency at pin #6 of IC 184 is 900 KHZ, since every tenth input pulse is deleter. IC 186 is an MC 14518B which is functionally a dual decade counter. The dual decade counter is connected in cascade (pin #6 to pin #10) and as a result will count to one hundred. In other words, it takes one hundred input pulses to deliver one input pulse. This frequency divider divides the frequency of 900 KH and provides an output frequency at pin #14 of IC 186 of 9 KHZ. IC 188 is also a dual decade counter, MC 14518B, but only one decade is used. The output frequency at pin #6 IC 188 is 900 HZ. Since the 900 HZ is derived from the crystal controlled 1 megahertz oscillator through digital counting circuits then the 900 HZ frequency repeats the accuracy and stability of the 1 megahertz oscillator. This is the reference frequency to which the digital trim control will slave the 900 HZ signnal generator by the speed sensor on the motor/-generator shaft. IC 190 and IC 192 are MC 14516B reversible decade counters. The 900 HZ reference frequency feeds the reversible counters to count up and the 900 HZ signal the speed sensor feeds into the counter to count down. The reversible counters, however, cannot count a pair of up and down pulses that occur at the same instant in time. If this condition occurs, the counter will count one and not the other, thereby creating an error in the stored count. Therefore, this condition must be prevented and an anti-coincidence circuit is added to accomplish this task. The anti-coincidence circuit is composed of integrated circuits 200, 204 and 206 and also parts of 208. Basically, the circuit operates by temporarily storing each and every pulse for up and down counting and then clocking the pulses out to the up/down inputs at different times. IC 206 is a type D flip flop (MC 14013B) which is connected to temporarily store each reference frequency pulse. IC 204 is also a type D flip flop (MC 14013B) and also connected to temporarily store each signal frequency pulse. The interconnection of the "D" type flip flops IC 204 and IC 206 is shown in FIG. 8. IC 200 is an MCV 14017B decade counter with a ten line decoded output; and it is used to create the clocking signals to operate the anti-coincidence circuit. IC 202 is an MC 14013B "D" type flip flop that is used to control the up/down counter function.

Figure 9:
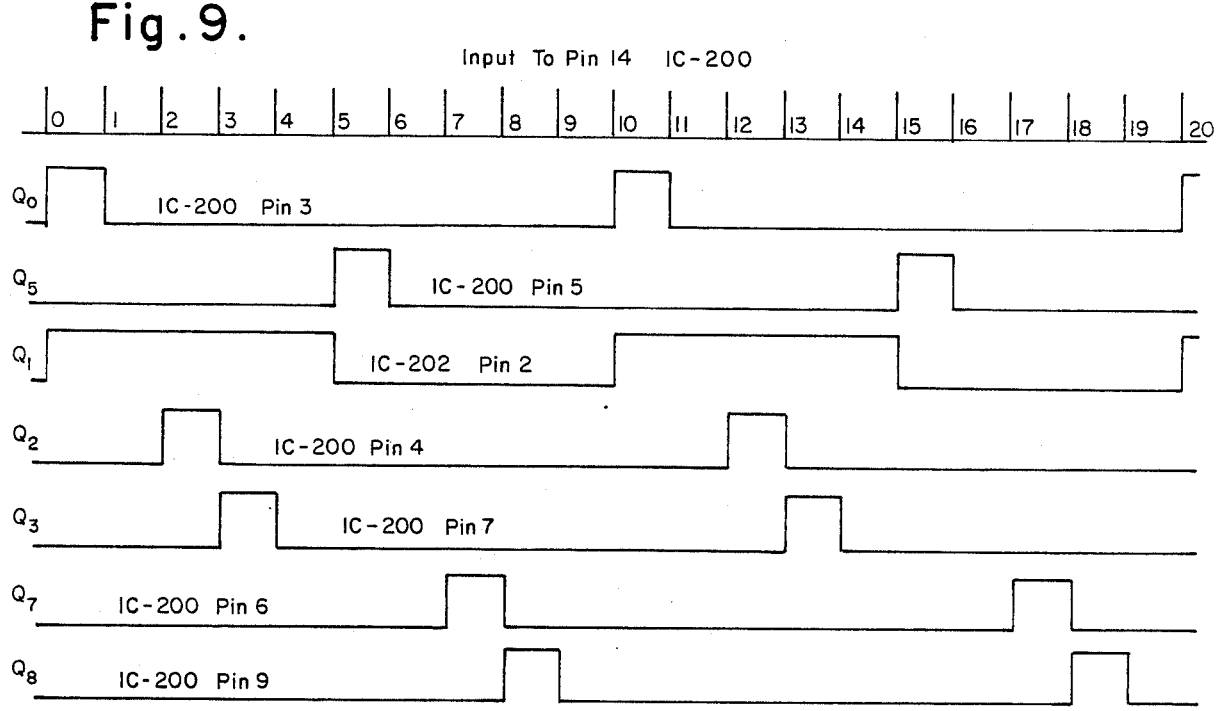
FIG. 9 is a chart of the clock pulse outputs from the integrated circuits 206 and 208 of FIG. 7.

FIG. 9 shows the clock pulse outputs from IC 200 and IC 202. IC 200 receives a one megahertz signal on its input pin #14. The integrated circuit 200 (MC 14017B) has ten separate output lines labeled $Q_0$ through $Q_9$. Each output line will deliver an output pulse once for every ten input pulses with each output occuring in time sequence. The outputs that are used for the anti-coincidence function are shown in FIG. 9. The output from pin #2 IC 202 is used to control the up/-down count line for the reversible counters. When $Q_1$ is in the high state (+12 volts) the control line is set for up counts, that is, any pulse occuring at pin #15 of IC 190 will be counted as an up pulse. When $Q_1$ is in the low state (0 volts) the control line is set for down counts, any pulse occuring at pin #15 of IC 190 will be counted as a down pulse. The outputs on pin #4, $Q_2$, and pin #7, $Q_3$, of IC 200 will clock IC 204 only when the up/down control line is in the up state. That means, therefore, if a count pulse is stored in the IC 204 it will be clocked out when $Q_2$ is high, and the following pulse from $Q_3$ or IC 200 will reset IC 204. If no pulse is stored in IC 204 when the clock pulse occurs then no pulse will be clocked out. The same thing occurs for IC 206 but only when the control line is set low for a downcount. Therefore, it is clearly seen that an up and a down pulse cannot be delivered at the same instant in time.

Referring again to FIG. 8 a positive going transition can occur at pin #3 of IC 206 at any unsynchronized moment. When it does occur the first "D" flip flop 206 is set. That is $Q_1$ is high and $Q_2$ is low. The count output from $Q_{13}$ is still low. However, when the next clock input occurs on pin #11 of IC 204 the second D flip flop 204 will go into transition because its "D" input pin #9 is high (from pin #1 of IC 206). That clock pulse will cause $Q_2$ to go high and thereby cause a count to occur. When $Q_2$ is high the first flip flop 206 is reset. The next following clock pulse will occur on pin #10 of IC 204 which then resets flip flop 204 and the circuit is ready to accept another input on pin #3 of IC 206.

Figure 10:
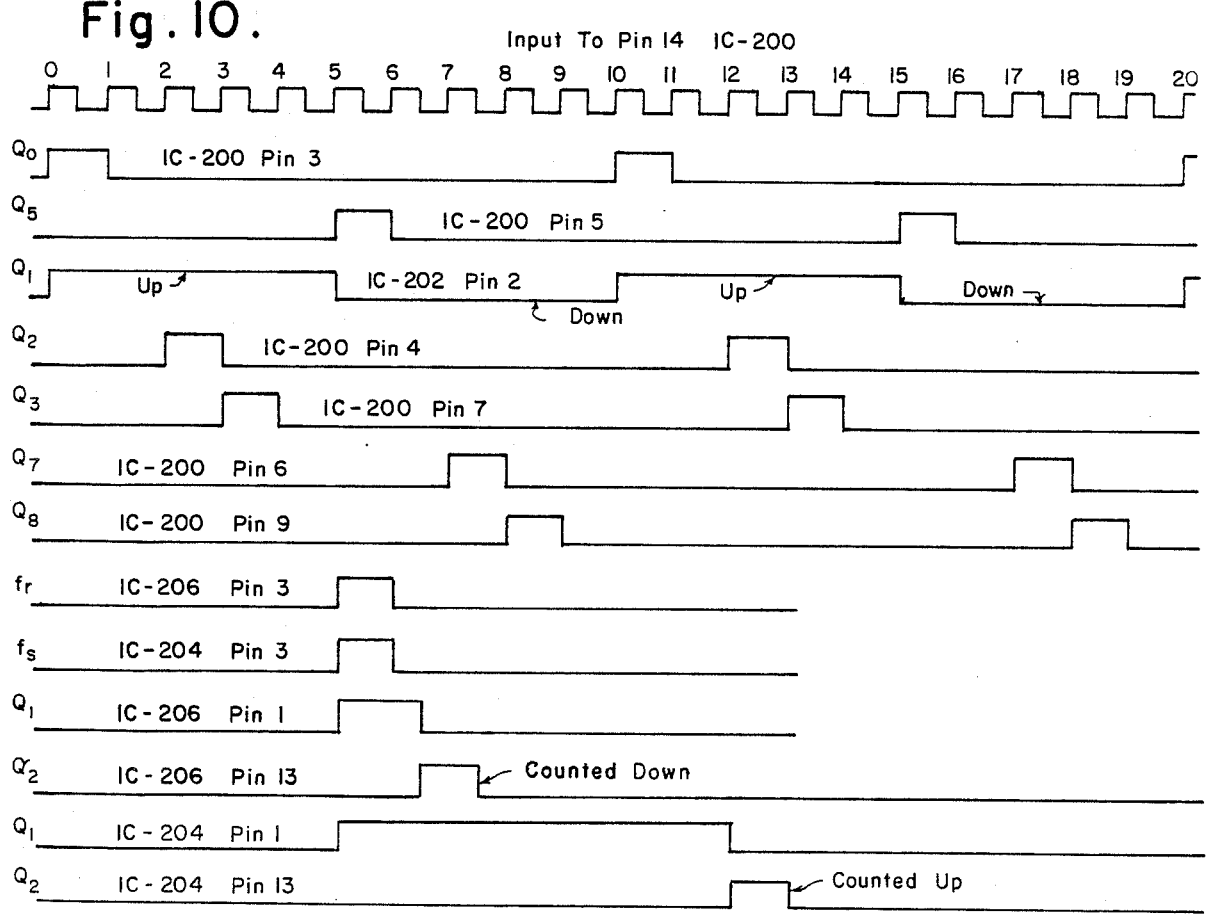
FIG. 10 is a pulse timing chart showing the pertinent outputs of the anti-coincidence circuits of FIG. 7.

FIG. 10 is a pulse timing chart that shows the pertinent outputs of the anti-coincidence circuits when two pulses from fr and fs occur simultaneously.

The final element of control logic deals with the counter spill over protection. The up/down counter is comprised of two 4 digit binary integrated circuits, IC 190 and IC 192. The total count runs from 00 to 225. If the counter has 255 stored and it receives as its next pulse an up count the counter would spill over to zero (00). Likewise if the counter were at 00 and the next pulse were a count down the counter would spill over to 255. This condition must be prevented. In other words, if the counter stored 255 and the next pulse were an up count, we want to block the counter so that it does not accept that pulse, but would accept the next down pulse. This is accomplished by connecting a carry out line from pin #7 of IC 192 to pins #12 and #13 of IC 208. Whenever the counter has 255 stored and the control line is up the IC 208 gate is closed because pin #7 count is low. Also whenever the counter has 00 stored and the control line is down then the count gate is closed. This constitutes the spill over protection.

The digital number that is stored in the counter is converted to a proportional direct current voltage by the action of the resistance ladder network connected to the counter output pins #6, 11, 14 and 2 of both IC 190 and IC 192. The resistance ladder network comprises seventeen resistors (210 through 226) connected as shown. The voltage at pin #1 of IC 230 will range a total of 6 volts for 255 counts in the counter. Resistors 232, 234 and 236 are connected between the pins of IC 230 as shown. Pin #1 of IC 230 is the digital trim output to the speed control and pin #3 of IC 204 is the input from the speed control.

While I have shown and described certain present preferred embodiments of the invention and have illustrated a present preferred method of practicing the same it is to be distinctly understood that the invention is not limited thereto but may be otherwise variously practiced within the scope of the following claims.

I claim:

1. A constant speed generator drive system adapted for use with a variable speed engine comprising:
   a. a variable displacement hydraulic pump connected to a powered rotating shaft;
   b. a hydraulic motor;
   c. hydraulic lines operatively connecting said hydraulic motor to said hydraulic pump;
   d. a drive shaft connecting said hydraulic motor to an electrical generator;
   e. means for controlling the displacement of said hydraulic pump relative to the magnitude of a direct current signal applied thereto;
   f. means for delivering a direct current signal to said displacement controlling means responsive to the hydraulic pressure in said hydraulic lines;
   g. speed sensor means;
   h. means for controlling the rotational speed of said drive shaft relative to said speed sensor means;
   i. timing reference means; and
   j. digital trim control means for adjusting said speed sensor means to correspond to said timing reference means.

2. A constant speed generator drive system according to claim 1 wherein said means for controlling the displacement of said hydraulic pump is a pressure feedback system comprising:
   a. a strain gage bridge pressure sensor energized and having a balanced direct current output singal proportional to pressure;
   b. first amplifier circuit means for amplifying said output signal of said strain gage;
   c. second amplifier circuit means for pressure control having a pressure loop compensating network and means for receiving an input command signal from said speed controlling means; and
   d. servo amplifer means for controlling the displacement of said hydraulic pump.

3. A constant speed generator drive system according to claim 1 wherein said means for controlling the speed of said drive shaft further comprises:
   a. speed sensor means for producing a direct current signal relative to the speed of said drive shaft;
   b. circuit means for converting said direct current signals to a series of constant area pulses wherein the average direct current voltage of said pulses is relative to the drive shaft speed;
   c. second circuit means for providing a voltage speed reference signal;
   d. third circuit means for comparing said constant area pulse voltage with said speed reference voltage to provide a speed error signal;
   e. fourth circuit means for providing a loop gain control for said speed controlling means responsive to said speed error signal; and
   f. fifth circuit means for providing dynamic compensation for said speed controllings means.

4. A constant speed generator drive system according to claim 1 wherein said timing reference means is a quartz crystal controlled oscillator having suitable divider circuits.

5. A constant speed generator drive system according to claim 1 further comprising a start up control circuit means for preventing an excessive overspeed transient during startings.

6. A constant speed generator drive system according to claim 3 wherein said digital trim control means further comprises:
   a. a counter means for computing and storing the frequency difference between said timing reference means and said speed sensor means;
   b. a digital to analog converter means for producing an output voltage relative to said frequency difference stored in said counter means; and
   c. a speed control means responsive to said output voltage of said analog converter means for adjusting the frequency of said speed reference means for coincide with said timng reference frquency.

7. A constant speed generator drive system according to claim 1 wherein apparatus for controlling the speed of said drive shaft comprises:
   a. speed sensor means for producing a direct current signal relative to the speed of said drive shaft;
   b. circuit means for converting said direct current signals to a series of constant area pulses wherein the average direct current voltage of said pulse is relative to the drive shaft speed;
   c. second circuit means for providing a voltage speed reference signal;
   d. third circuit means for comparing said constant area pulse voltage with said speed reference voltage to provide a speed error signal;
   e. fourth circuit means for providing a loop gain control for said speed controlling means resspon-sive to said speed error signal; and
   f. fifth circuit means for providing dynamic compensation for said speed controlling means.

8. An apparatus as claimed in claim 7 wherein the circuit converting direct current signals includes a timing reference means for controlling the timing of the constant area pulses.

9. An apparatus as claimed in claim 8 wherein said timing reference means is a quartz crystal controlled oscillator having a suitable divider circuits.

10. An apparatus as claimed in claim 7 including a start-up control circuit means for preventing an excessive overspeed transient during start-up.

11. An apparatus as claimed in claim 8 having digital trim control means for adjusting said speed reference means to correspond to said timing reference means.

12. An apparatus as claimed in claim 11 wherein the digital trim control means comprises:

a. a counter means for computing and storing the frequency difference between said timing reference means and said speed sensor means;

b. a digital to analog converter means for producing an output voltage relative to said frequency difference stored in said counter means; and c. a speed control means responsive to said output voltage of said analog converter means for adjusting the frequency of said speed reference means to coincide with said timing reference frequency.

* * * * *

UNITED STATES PATENT AND TRADEMARK OFFICE
CERTIFICATE OF CORRECTION

PATENT NO. : 4,879,501

DATED : November 7, 1989

INVENTOR(S) : LAMBERT HANER

Page 1 of 2

It is certified that error appears in the above-identified patent and that said Letters Patent is hereby corrected as shown below: On the title page:

At 56, References Cited, 4,245,162, change "Rennen" to --Ronnen-- and 4,425,758, change "Schexnaydel" to --Schexnayder--.

In the Abstract, line 14, after "the" insert --analog--.

Column 1, line 18, change "conytrol" to --control--.

Column 3, line 3, delete "signals" and insert --signal. This pressure feedback signal is--.

Column 3, line 31, change "As." to --As--.

Column 3, line 37, after "is" insert --a--.

Column 4, line 8, change "contant" to --constant--.

Column 6, line 51, change "factthat" to --fact that--.

Column 6, line 18, change "136" to --134--.

Column 7, line 32, change "162" to --163--.

Column 7, line 36, change "aquare" to --square--.

Column 7, line 46, change "deleter" to --deleted--.

UNITED STATES PATENT AND TRADEMARK OFFICE
CERTIFICATE OF CORRECTION

PATENT NO. : 4,879,501
DATED : November 7, 1989
INVENTOR(S) : LAMBERT HANER

It is certified that error appears in the above-identified patent and that said Letters Patent is hereby corrected as shown below:

Column 7, line 61, change "signnal" to --signal--.

Column 8, line 67, change "225" to --255--.

Column 9, line 61, change "singal" to --signal--.

Column 10, line 21, change "controllings" to --controlling--.

Column 10, line 41, change "for" to --to--.

Column 10, line 42, change "timng" to --timing--.

Column 10, lines 58-59, change "respsonsive" to --responsive--.

Column 10, line 68, delete "a".

Signed and Sealed this

Twenty-third Day of October, 1990

Attest:

HARRY F. MANBECK, JR.

*Attesting Officer*  *Commissioner of Patents and Trademarks*